(12) United States Patent
Ristimäki et al.

(10) Patent No.: US 8,670,253 B2
(45) Date of Patent: Mar. 11, 2014

(54) CONVERTER PROTECTING COMPONENTS AGAINST OVERVOLTAGES

(75) Inventors: Ari Ristimäki, Laihia (FI); Nicklas Södö, Vaasa (FI); Matti Takala, Vaasa (FI); Mika Levonen, Tampere (FI)

(73) Assignee: Vacon Oyj, Vaasa (FI)

( * ) Notice: Subject to any disclaimer, the term of this patent is extended or adjusted under 35 U.S.C. 154(b) by 456 days.

(21) Appl. No.: 12/837,682

(22) Filed: Jul. 16, 2010

(65) Prior Publication Data

US 2011/0044080 A1   Feb. 24, 2011

(30) Foreign Application Priority Data

Aug. 18, 2009  (FI) ..................................... 20095852

(51) Int. Cl.
  *H02M 1/32*   (2007.01)
  *H02M 7/155*  (2006.01)

(52) U.S. Cl.
  USPC .................. 363/54; 363/70; 363/85; 363/128

(58) Field of Classification Search
  USPC ............... 363/52–54, 69, 70, 85, 87, 88, 126, 363/128, 129
  See application file for complete search history.

(56) References Cited

U.S. PATENT DOCUMENTS

| | | | | |
|---|---|---|---|---|
| 4,396,877 A | * | 8/1983 | Egri et al. | 318/261 |
| 4,884,182 A | * | 11/1989 | Ando et al. | 363/37 |
| 4,941,077 A | * | 7/1990 | Fabianowski et al. | 363/49 |
| 5,016,135 A | * | 5/1991 | Zylstra | 361/156 |
| 6,226,166 B1 | * | 5/2001 | Gumley et al. | 361/118 |
| 6,958,923 B2 | * | 10/2005 | Nuutinen | 363/54 |
| 2010/0067273 A1 | * | 3/2010 | Chen | 363/125 |

FOREIGN PATENT DOCUMENTS

| | | |
|---|---|---|
| DE | 4034723 A1 | 4/1992 |
| DE | 92 16 662 U1 | 1/1993 |
| DE | 257 533 B5 | 5/1995 |
| DE | 197 10 371 C1 | 9/1998 |
| EP | 0 818 867 A1 | 1/1998 |

OTHER PUBLICATIONS

Search Report issued in corresponding Finnish Patent Application No. 20095852 dated May 27, 2011.
Finnish Search Report, dated Jun. 14, 2010, from corresponding Finnish application.

(Continued)

*Primary Examiner* — Adolf Berhane
*Assistant Examiner* — Fred E Finch, III
(74) *Attorney, Agent, or Firm* — Young & Thompson

(57) ABSTRACT

A converter includes a converter bridge (101) adapted to transfer electrical energy between the AC terminal (102) and the DC terminal (103) of the converter. The converter also includes electrical paths bypassing the converter bridge for conducting overvoltage transients occurring in the AC terminal around the converter bridge to the DC terminal. Each electrical path includes a unidirectionally conductive semiconductor component (104a, 104b, 104c), such as a diode, and a voltage-limiting component (105) for which the ratio of voltage change to current change is small when the voltage of the voltage-limiting component is greater than a predetermined threshold voltage. Because of the overvoltage protection thus achieved, AC chokes can be omitted from the AC terminal or at least they can be designed smaller, reducing the load-dependent voltage drop of the DC terminal.

20 Claims, 4 Drawing Sheets

(56) References Cited

OTHER PUBLICATIONS

Haberberger M et al: "Novel protection strategy for current interruptions in IGBT current source inverters.", Jun. 20, 2004, Power Electronics Specialists Conference, IEEE 35th Annual, pp. 558-564, vol. 1, XP010738409.

European Search Report, dated Mar. 28, 2011, in Application No. EP 10 16 6956.

* cited by examiner

CONVERTER PROTECTING COMPONENTS AGAINST OVERVOLTAGES

FIELD OF INVENTION

The invention relates to a method for protecting semiconductor components in a converter against overvoltages. The invention also relates to a converter with overvoltage protection.

BACKGROUND OF INVENTION

Many power electronic converters such as frequency converters, for example, include a converter bridge adapted to transfer electrical energy between the AC mains and the DC terminal of the converter. Said DC terminal can be represented by the positive and negative rails in the intermediate DC link of a frequency converter, for instance. To make the charging of the intermediate DC link easier, the converter bridge often includes controlled semiconductor components such as thyristors or transistors, for example. The converter bridge may also be a half-controlled bridge in which only one branch, connected with the positive or negative pole of said DC terminal, includes controlled semiconductor components, while the opposite branch includes diodes. Diodes and other semiconductor components have to be protected against potential overvoltage transients occurring in the AC mains. Thyristors, for instance, have a turn-on delay of 2 µs, approximately, during which time the forward voltage in the thyristor may rise detrimentally high even if a firing pulse were continuously delivered to the thyristor. If the circuit connected with the thyristor has a small inductance and the forward voltage of the thyristor is too high at the turn-on moment, the rate of change of current (di/dt, A/s) may become so high that the thyristor becomes damaged. For diodes, on the other hand, a typical damaging mechanism is a breakdown caused by a reverse voltage too high.

In a prior-art solution, AC chokes are placed between the AC mains and the converter bridge to filter out overvoltage transients occurring in the AC mains and to restrict the rates of change of current in the semiconductor components in the converter bridge. A drawback of said AC chokes is that they increase the load-dependent voltage drop of the DC voltage in the DC terminal. In the case of a diode and/or thyristor bridge, for example, said AC chokes increase the commutation angle and thus decrease the DC voltage and affect the power factor at the DC terminal.

SUMMARY

The invention is directed to a novel converter with overvoltage protection. A converter according to the invention comprises:
- a converter bridge adapted to transfer electrical energy between the AC terminal and DC terminal of said converter,
- at least one capacitor on an electrical path from a first pole of the DC terminal to a second pole of the DC-terminal, and
- electrical paths for conducting overvoltage transients occurring in said AC terminal into said DC terminal so as to absorb the overvoltage transients into the at least one capacitor, where the electrical paths are provided between each of the phases of said AC terminal and a first pole of said DC terminal, wherein each of said electrical paths comprises:
- a unidirectionally conductive semiconductor component and
- a voltage-limiting component in which the ratio of voltage to current is greater than a predetermined value in response to a situation where the voltage across the voltage-limiting component is smaller than a predetermined threshold voltage, and in which the ratio of voltage change to current change is smaller than said predetermined value in response to a situation where the voltage across the voltage-limiting component is greater than said threshold voltage, the predetermined threshold voltage being greater than voltage between one of the phases of the AC terminal and the first pole of the DC terminal when current flows, via the converter bridge, between the one of the phases of the AC terminal and the first pole of the DC terminal so as to allow the converter bridge to determine voltage of the DC terminal.

The invention is also directed to a novel method for protecting semiconductor components in a converter bridge against overvoltages, the converter bridge being adapted to transfer electrical energy between the AC terminal and DC terminal of the converter. In the method according to the invention, overvoltage transients occurring in said AC terminal are conducted into said DC terminal via electrical paths provided between each of the phases of said AC terminal and said DC terminal so as to absorb the overvoltage transients into at least one capacitor on an electrical path from a first pole of the DC terminal to a second pole of the DC terminal, each path comprising a unidirectionally conductive semiconductor component and a voltage-limiting component in which the ratio of voltage to current is greater than a predetermined value in response to a situation where the voltage across the voltage-limiting component is smaller than a predetermined threshold voltage, and in which the ratio of voltage change to current change is smaller than said predetermined value in response to a situation where the voltage across the voltage-limiting component is greater than said threshold voltage, the predetermined threshold voltage being greater than voltage between one of the phases of the AC terminal and the first pole of the DC terminal when current flows, via the converter bridge, between the one of the phases of the AC terminal and the first pole of the DC terminal so as to allow the converter bridge to determine voltage of the DC terminal.

The voltage-limiting component may be e.g. a varistor or a transient voltage suppressor (TVS). The unidirectionally conductive semiconductor component may be e.g. a diode or a transistor the control terminal of which is connected to another terminal; e.g. a bipolar transistor the base of which is connected to the emitter or the collector depending on the type of the transistor. Because of the overvoltage protection thus achieved, AC chokes can be omitted from the AC terminal or at least they can be designed smaller, reducing the load-dependent voltage drop of the DC terminal.

The various exemplifying embodiments of the invention are characterised by that which is specified in the dependent claims.

BRIEF DESCRIPTION OF DRAWINGS

Embodiments of the invention, presented by way of example, and their advantages will now be described in closer detail with reference to the accompanying Figures where.

DESCRIPTION OF EMBODIMENTS OF INVENTION

Figure 1:
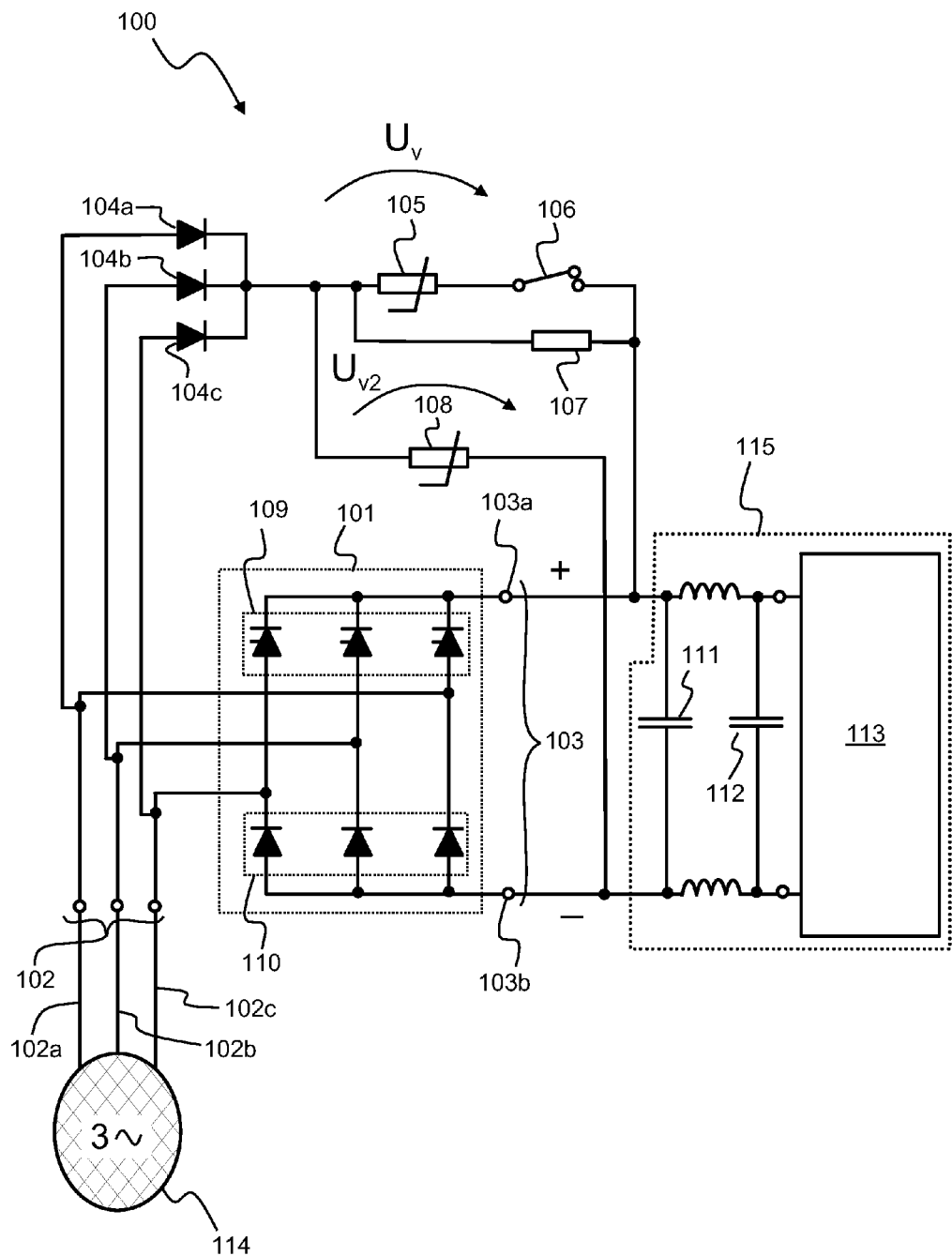
FIG. 1 is a schematic illustration of a converter according to an embodiment of the invention.

FIG. 1 is a schematic illustration of a converter 100 according to an embodiment of the invention. The converter comprises a converter bridge 101 adapted to transfer electrical energy from the AC terminal 102 to the DC terminal 103 of the converter. Through the AC terminal 102 the converter is connected to the AC mains 114, and through the DC terminal 103 the converter bridge 101 is connected to the block 115 which loads the converter bridge. The converter may be e.g. a frequency converter, in which case the block 113 comprises an inverter bridge. The converter bridge 101 is a half-controlled rectifier bridge with thyristors 109 in the upper branch and diodes 110 in the lower branch. By means of the thyristors 109 the converter bridge can be turned off when necessary, e.g. when charging the capacitors 111 and 112 through an external charge circuit. The thyristors 109 may also be used for regulating the DC voltage output by the converter bridge 101. It should be noted that the converter bridge in the converter may be different than that depicted in FIG. 1. The converter bridge may be e.g. a mains inverter bridge in which each of the diodes 110 and each of the thyristors 109 is replaced by a transistor such as an insulated gate bipolar transistor (IGBT) and a diode in reverse parallel connection. The converter comprises electrical paths bypassing the converter bridge 101 for conducting overvoltage transients occurring in the AC terminal 102 around the converter bridge 101 to the DC terminal 103 and further to a capacitor 111. The electrical paths have diodes 104a, 104b, and 104c and a voltage-limiting component 105 which may be e.g. a varistor or a transient voltage suppressor (TVS). The ratio of voltage to current (u/i, Ω) in the voltage-limiting component 105 is greater than a predetermined value R when the voltage $U_v$ across the voltage-limiting component is smaller than a predetermined threshold voltage $U_{th}$, and the ratio of voltage change to current change (du/di, Ω) is considerably smaller than said predetermined value R when the voltage $U_v$ across the voltage-limiting component is greater than said threshold voltage $U_{th}$. So, when $U_v < U_{th}$, the current through the voltage-limiting component is smaller than $U_v/R$, and when $U_v > U_{th}$, the voltage $U_v$ across the voltage-limiting component will substantially not increase even if the current through the voltage-limiting component increases, because the ratio of voltage change to current change du/di is small. The ratio of voltage change to current change (du/di) may be e.g. smaller than R/10 when $U_v > U_{th}$. The diodes 104a, 104b, and 104c are connected, all in the same direction, between the phases 102a, 102b, and 102c of the AC terminal 102 and a first pole of the voltage-limiting component 105. A second pole of the voltage-limiting component 105 is connected to a first pole 103a of the DC terminal 103 which in the converter depicted in FIG. 1 is the positive pole of the DC terminal.

The maximum forward voltage across each of the thyristors 109 substantially equals the threshold voltage $U_{th}$ of the voltage-limiting component 105 because the diodes 104a, 104b, and 104c, which are adapted to conduct electric current towards the positive pole of the DC terminal 103, will choose the highest one of the potentials in the phases 102a, 102b, and 102c of the AC terminal 102 for the voltage-limiting component 105. Limiting the forward voltage of the thyristor also limits the rate of change of current (di/dt) following the firing of the thyristor and thus protects the thyristor from being damaged. If the RMS value for the main voltage in the AC mains 114 is 500 V, for example, and the thyristors 109 and diodes 110 can withstand 1600 V, a threshold voltage $U_{th}$ of 60 V, for instance, can be chosen for the voltage-limiting component 105.

In a converter according to an embodiment of the invention, the second pole of the voltage-limiting component 105 is connected to the first pole 103a of the DC terminal via a switch 106 by means of which the voltage-limiting component can be disconnected from said first pole e.g. for the duration of the charging of the capacitors 111 and 112.

In a converter according to an embodiment of the invention, there is a resistor 107 in parallel with the series connection comprised of the voltage-limiting component 105 and switch 106. The diodes 104a, 104b, and 104c and the resistor 107 can be used together with the diodes 110 to charge the capacitors 111 and 112 when the switch 106 is in a nonconducting state.

In a converter according to an embodiment of the invention, there is between the first pole of the voltage-limiting component 105 and the second pole 103b of the DC terminal, which in FIG. 1 is the negative pole of the DC terminal, a second voltage-limiting component 108 for which the ratio of voltage to current (u/i) is greater than a predetermined value R when the voltage $U_{v2}$ across the voltage-limiting component is smaller than a predetermined threshold voltage $U_{th2}$, and the ratio of voltage change to current change (du/di) is considerably smaller than said predetermined value R when the voltage $U_{v2}$ across the voltage-limiting component is greater than said threshold voltage $U_{th2}$. The voltage-limiting component 108 may be e.g. a varistor or a transient voltage suppressor (TVS). The maximum reverse voltage across each of the diodes 110 substantially equals the threshold voltage $U_{th2}$ because the diodes 104a, 104b, and 104c will choose the highest one of the potentials in the phases 102a, 102b, and 102c of the AC terminal 102 for the voltage-limiting component 108. The threshold voltage $U_{th2}$ of the voltage-limiting component 108 can be the voltage which the diodes 110 can withstand minus a safety margin.

Figure 2:
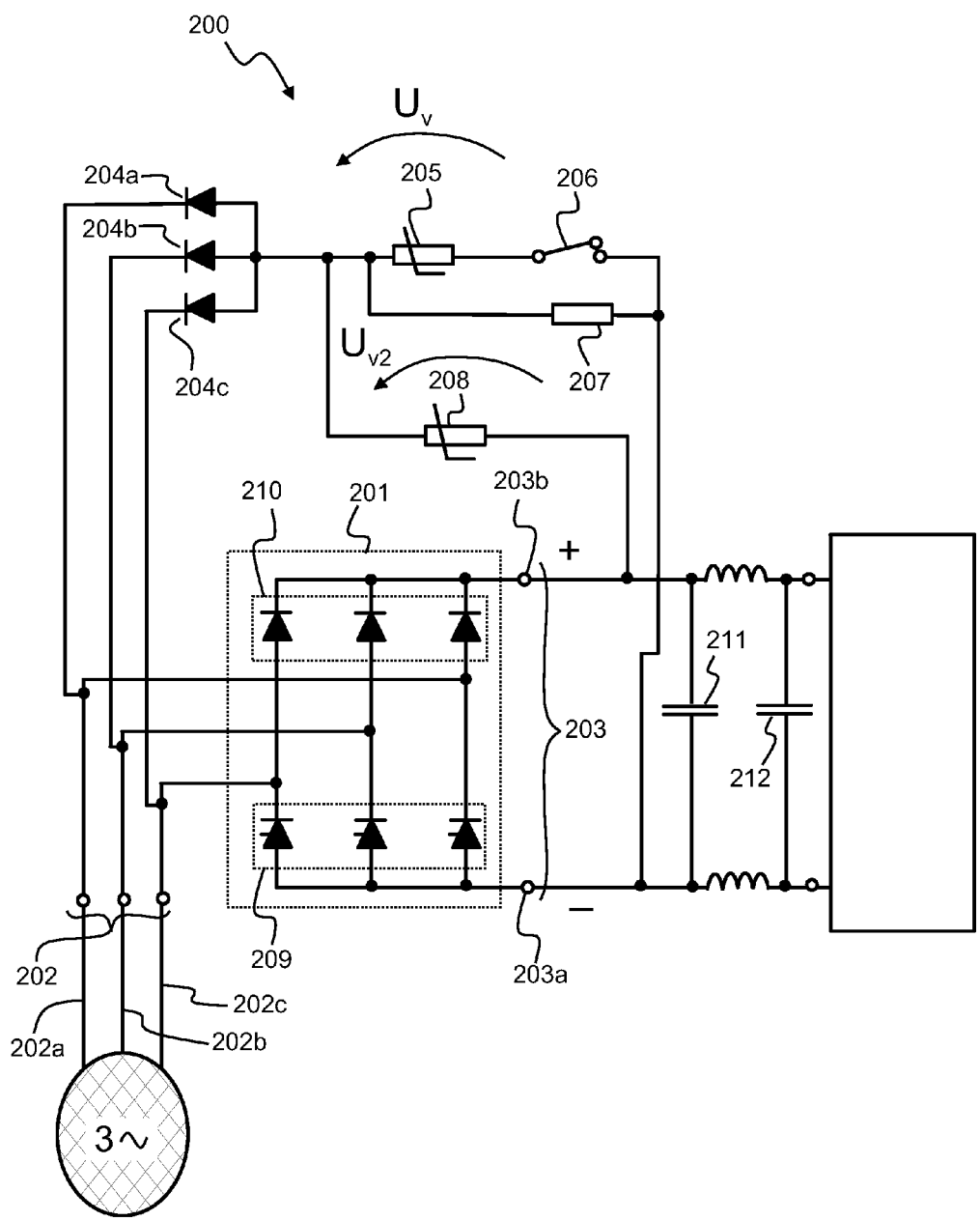
FIG. 2 is a schematic illustration of a converter according to an embodiment of the invention.

FIG. 2 is a schematic illustration of a converter 200 according to an embodiment of the invention. The converter comprises a converter bridge 201 adapted to transfer electrical energy from the AC terminal 202 to the DC terminal 203 of the converter. The converter bridge 201 is a half-controlled rectifier bridge with thyristors 209 in the lower branch and diodes 210 in the upper branch unlike in the case depicted in FIG. 1 where there were diodes in the lower branch and thyristors in the upper branch. The converter comprises electrical paths bypassing the converter bridge 201 for conducting overvoltage transients occurring in the AC terminal 202 around the converter bridge 201 to the DC terminal 203 and further to a capacitor 211. On said electrical paths there is a voltage-limiting component 205 for which the ratio of voltage to current (u/i) is greater than a predetermined value R when the voltage $U_v$ across the voltage-limiting component is smaller than a predetermined threshold voltage $U_{th}$, and the ratio of voltage change to current change (du/di) is considerably smaller than said predetermined value R when the voltage $U_v$ across the voltage-limiting component is greater than said threshold voltage $U_{th}$. The voltage-limiting component 205 may be e.g. a varistor or a transient voltage suppressor (TVS). Between the phases 202a, 202b, and 202c of the AC terminal 202 and the voltage-limiting component 205 there are diodes 204a, 204b, and 204c connected in the same direction. One pole of the voltage-limiting component 205 is connected to a first pole 203a of the DC terminal 203 which in the case depicted in FIG. 2 is the negative pole of the DC terminal. The maximum forward voltage across each of the thyristors 209 substantially equals said threshold voltage $U_{th}$ because the diodes 204a, 204b, and 204c, which are adapted to conduct electric current towards the AC terminal 203, will choose the smallest one of the potentials in the phases 202a, 202b, and 202c of the AC terminal 202 for the first pole of the voltage-limiting component 205.

In a converter according to an embodiment of the invention there is a second voltage-limiting component 208 for which the ratio of voltage to current (u/i) is greater than a predetermined value R when the voltage $U_{v2}$ across the voltage-limiting component is smaller than a predetermined threshold voltage $U_{th2}$, and the ratio of voltage change to current change (du/di) is considerably smaller than said predetermined value R when the voltage $U_{v2}$ across the voltage-limiting component is greater than said threshold voltage $U_{th2}$. The maximum reverse voltage across each of the diodes 210 substantially equals the threshold voltage $U_{th2}$ because the diodes 204a, 204b, and 204c will choose the smallest one of the potentials in the phases 202a, 202b, and 202c of the AC terminal 202 for the voltage-limiting component 208. The threshold voltage $U_{th2}$ of the voltage-limiting component 208 can be set at the voltage which the diodes 210 can withstand minus a safety margin.

In a converter according to an embodiment of the invention, the voltage-limiting component 205 is connected to a first pole 203a of the DC terminal via a switch 206 by means of which the voltage-limiting component can be disconnected from said first pole e.g. for the duration of the charging of the capacitors 211 and 212.

In a converter according to an embodiment of the invention, there is a resistor 207 in parallel with the series connection comprised of the voltage-limiting component 205 and switch 206. The diodes 204a, 204b, and 204c and the resistor 207 can be used together with the diodes 210 to charge the capacitors 211 and 212 when the switch 206 is in a nonconducting state.

Figure 3:
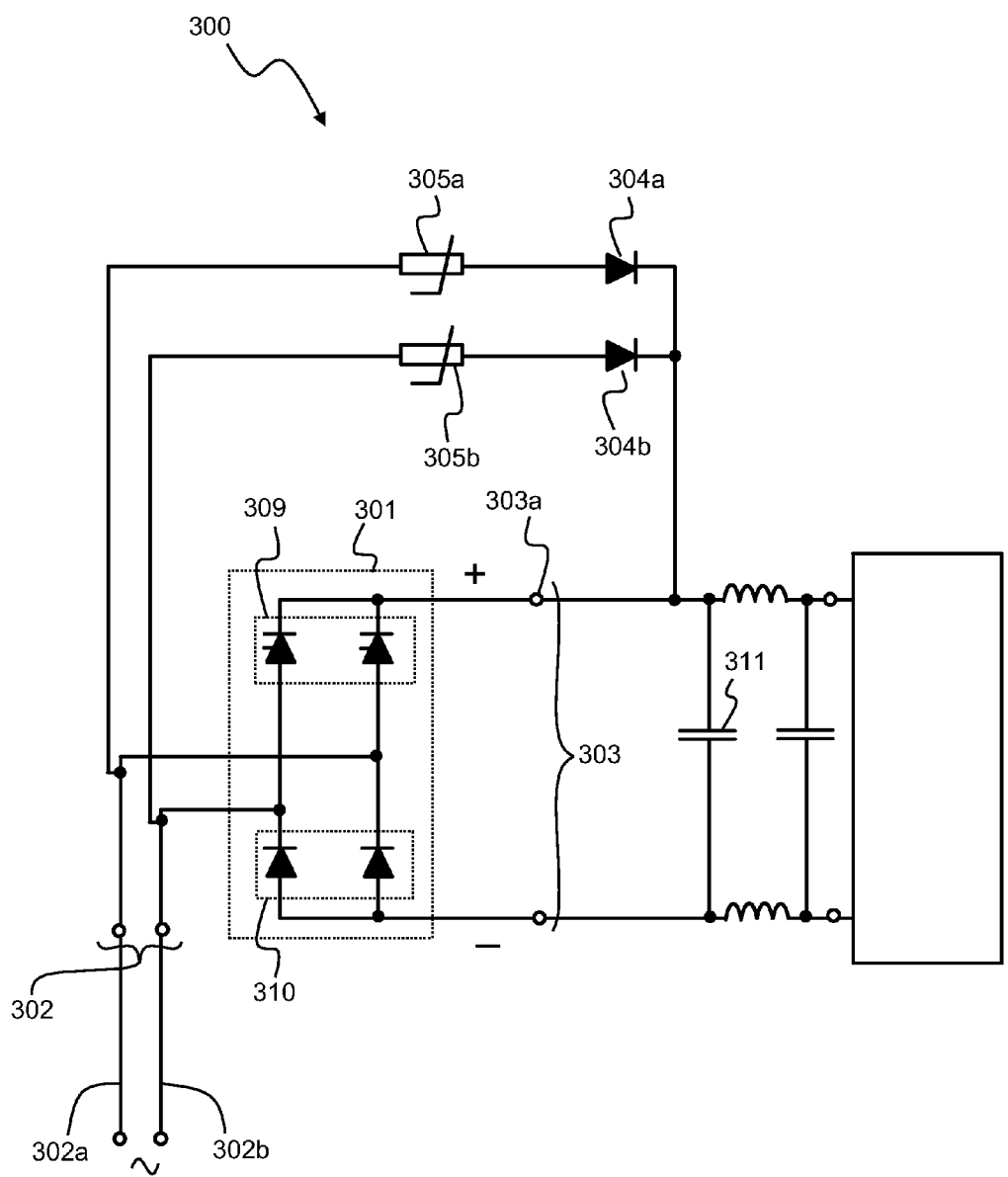
FIG. 3 is a schematic illustration of a converter according to an embodiment of the invention.

FIG. 3 is a schematic illustration of a converter 300 according to an embodiment of the invention. The converter comprises a converter bridge 301 adapted to transfer electrical energy from the AC terminal 302 to the DC terminal 303 of the converter. The converter bridge 301 is a half-controlled rectifier bridge with thyristors 309 in the upper branch and diodes 310 in the lower branch. The converter comprises electrical paths bypassing the converter bridge 301 for conducting overvoltage transients occurring in the AC terminal 302 around the converter bridge 301 to the DC terminal 303 and further to a capacitor 311. On said electrical paths there are voltage-limiting components 305a and 305b for which the ratio of voltage to current (u/i) is greater than a predetermined value R when the voltage across the voltage-limiting component is smaller than a predetermined threshold voltage, and the ratio of voltage change to current change (du/di) is considerably smaller than said value R when the voltage is greater than said threshold voltage. Between the phase 302a of the AC terminal 302 and a first pole 303a of the DC terminal 303 there is a series connection comprised of a voltage-limiting component 305a and a diode 304a, and between the phase 302b of the AC terminal and the first pole 303a of the DC terminal there is a series connection comprised of a voltage-limiting component 305b and a diode 304b. In the situation depicted in FIG. 3 the first pole 303a of the DC terminal 303 is the positive pole of the DC terminal. The maximum forward voltage across each of the thyristors 309 substantially equals the threshold voltage of the voltage-limiting components 305a and 305b.

Figure 4:
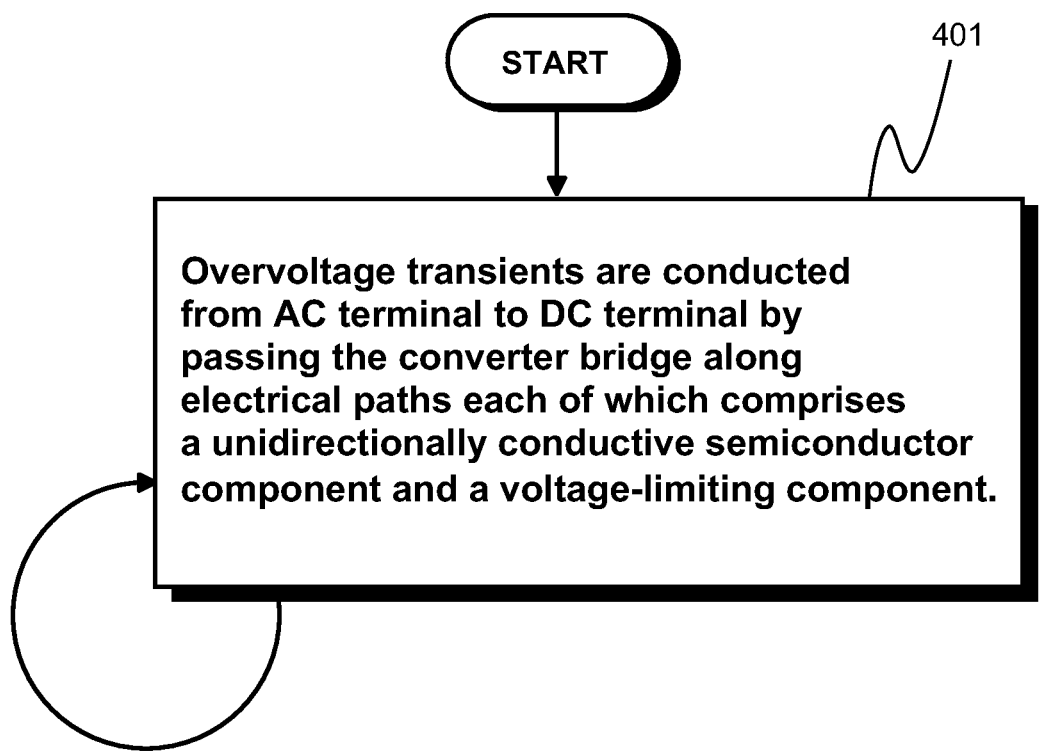
FIG. 4 is a flow chart illustrating a method according to an embodiment of the invention for protecting semiconductor components in a converter bridge against overvoltages.

FIG. 4 is a flow chart illustrating a method according to an embodiment of the invention for protecting semiconductor components in a converter bridge against overvoltages. The method comprises a step, block 401, for conducting overvoltage transients occurring in said AC terminal into said DC terminal via electrical paths between each of the phases of the AC terminal and a first pole of the DC terminal, each electrical path comprising a unidirectionally conductive semiconductor component and a voltage-limiting component. The ratio of voltage to current (u/i) in the voltage-limiting component is greater than a predetermined value R when the voltage across the voltage-limiting component is smaller than a predetermined threshold voltage, and the ratio of voltage change to current change (du/di) is considerably smaller than said value R when the voltage is greater than said threshold voltage.

In a method according to an embodiment of the invention the voltage-limiting component is a varistor, and in a method according to another embodiment of the invention the voltage-limiting component is a transient voltage suppressor (TVS).

In a method according to an embodiment of the invention the voltage-limiting component in each of said electrical paths is common to said electrical paths. A first pole of the voltage-limiting component is connected to a first pole of the DC terminal, and a second pole of the voltage-limiting component is connected with the unidirectionally conductive semiconductor components of the electrical paths, said semiconductor components being connected mutually in the same direction.

In a method according to an embodiment of the invention the reverse voltage in the semiconductor components of said converter bridge is limited by means of a second voltage-limiting component located between a first pole of said voltage-limiting component and a second pole of said DC terminal, which second voltage-limiting component may be a varistor or a transient voltage suppressor (TVS), for example.

In a method according to an embodiment of the invention said first pole of the DC terminal is the positive pole of the DC terminal and each unidirectionally conductive semiconductor component is arranged to conduct electric current towards the positive pole of the DC terminal.

In a method according to an embodiment of the invention said first pole of the DC terminal is the negative pole of the DC terminal and each unidirectionally conductive semiconductor component is arranged to conduct electric current towards the AC terminal.

In a method according to an embodiment of the invention the unidirectionally conductive semiconductor component is a diode.

As is obvious to a person skilled in the art, the invention and its embodiments are not limited to the illustrative embodiments described above.

Expressions used in the claims describing the existence of characteristic features, such as "electrical path comprises a unidirectionally conductive semiconductor component" are non-exclusive such that a mention of a characteristic feature shall not exclude nor require the existence of other characteristic features not mentioned in the independent or dependent claims.

The invention claimed is:

1. A converter, comprising:
   a converter bridge configured to transfer electrical energy between an AC terminal and a DC terminal of the converter;
   at least one capacitor on an electrical path from a first pole of the DC terminal to a second pole of the DC terminal; and
   electrical paths for conducting overvoltage transients occurring in said AC terminal into said DC terminal in order to absorb the overvoltage transients into the at least one capacitor, the electrical paths being located between each of the phases of the AC terminal and the first pole of the DC terminal, each electrical path comprising:
      a unidirectionally conductive semiconductor component, and
      a voltage-limiting component in which the ratio of voltage to current is greater than a predetermined value in response to a situation in which the voltage across the voltage-limiting component is smaller than a predetermined threshold voltage, and in which the ratio of voltage change to current change is smaller than said predetermined value in response to a situation in which the voltage across the voltage-limiting component is greater than said threshold voltage, the predetermined threshold voltage being greater than a voltage between one of the phases of the AC terminal and the first pole of the DC terminal when current flows, via the converter bridge, between the one of the phases of the AC terminal and the first pole of the DC terminal so as to allow the converter bridge to determine a voltage of the DC terminal.

2. The converter according to claim 1, wherein the voltage-limiting component on each of the electrical paths is common to said electrical paths and a first pole of the voltage-limiting component is connected to said first pole of the DC terminal, and
   a second pole of the voltage-limiting component is connected with the unidirectionally conductive semiconductor components of the electrical paths, said semiconductor components being connected mutually in the same direction.

3. The converter according to claim 2, wherein one pole of the voltage-limiting component is connected to the first pole of the DC terminal via a switch.

4. The converter according to claim 3, further comprising a resistor configured to supply energy from said AC terminal to said DC terminal via said unidirectionally conductive semiconductor components, the resistor being in parallel with a series connection comprised of the voltage-limiting component and the switch.

5. The converter according to claim 2, further comprising a second voltage-limiting component between the first pole of said voltage-limiting component and the second pole of said DC terminal.

6. The converter according to claim 1, wherein said first pole of the DC terminal is the positive pole of the DC terminal and each unidirectionally conductive semiconductor component is adapted to conduct electric current towards said positive pole of the DC terminal.

7. The converter according to claim 6, wherein said converter bridge comprises:
   thyristors between the phases of the AC terminal and the positive pole of the DC terminal, and
   diodes between the negative pole of the DC terminal and the phases of the AC terminal.

8. The converter according to claim 1, wherein said first pole of the DC terminal is the negative pole of the DC terminal and each unidirectionally conductive semiconductor component is adapted to conduct electric current towards the AC terminal.

9. The converter according to claim 8, wherein said converter bridge comprises:
   diodes between the phases of the AC terminal and the positive pole of the DC terminal, and
   thyristors between the negative pole of the DC terminal and the phases of the AC terminal.

10. The converter according to claim 1, wherein the unidirectionally conductive semiconductor component is a diode.

11. The converter according to claim 1, wherein the voltage-limiting component is one of a varistor, and a transient voltage suppressor (TVS).

12. The converter according to claim 1, wherein the electrical paths bypass the converter bridge to conduct the overvoltage transients occurring in the AC terminal around the converter bridge to the at least one capacitor.

13. A method for protecting semiconductor components in a converter bridge against overvoltages, the converter bridge being configured to transfer electrical energy between an AC terminal and a DC terminal of a converter, the method comprising:
   conducting overvoltage transients occurring in said AC terminal into said DC terminal via electrical paths provided between each of the phases of said AC terminal and a first pole of the DC terminal in order to absorb the overvoltage transients into at least one capacitor on an electrical path from the first pole of the DC terminal to a second pole of the DC terminal, each electrical path comprising a unidirectionally conductive semiconductor component and a voltage-limiting component in which the ratio of voltage to current is greater than a predetermined value in response to a situation in which the voltage across the voltage-limiting component is smaller than a predetermined threshold voltage, and in which the ratio of voltage change to current change is smaller than said predetermined value in response to a situation in which the voltage across the voltage-limiting component is greater than said threshold voltage, the predetermined threshold voltage being greater than a voltage between one of the phases of the AC terminal and the first pole of the DC terminal when current flows, via the converter bridge, between the one of the phases of the AC terminal and the first pole of the DC terminal so as to allow the converter bridge to determine a voltage of the DC terminal.

14. The method according to claim 13, wherein the voltage-limiting component on each of the electrical paths is common to said electrical paths, and a first pole of the voltage-limiting component is connected to said first pole of the DC terminal, and a second pole of the voltage-limiting component is connected with the unidirectionally conductive semiconductor components of the electrical paths, said semiconductor components being connected mutually in the same direction.

15. The method according to claim 14, wherein a reverse voltage in the semiconductor components of said converter bridge is limited by another voltage-limiting component located between a first pole of said voltage-limiting component and the second pole of said DC terminal.

16. The method according to claim 13, wherein said first pole of the DC terminal is the positive pole of the DC terminal and each unidirectionally conductive semiconductor component is adapted to conduct electric current towards the positive pole of the DC terminal.

17. The method according to claim 13, wherein said first pole of the DC terminal is the negative pole of the DC terminal and each unidirectionally conductive semiconductor component is adapted to conduct electric current towards the AC terminal.

18. The method according to claim 13, wherein the unidirectionally conductive semiconductor component is a diode.

19. A method according to claim 13, wherein the voltage-limiting component is one of a varistor and a transient voltage suppressor (TVS).

20. The method according to claim 13, wherein the overvoltage transients are conducted via the electrical paths around the converter bridge to the at least one capacitor.

* * * * *